Patented Aug. 14, 1951

2,563,873

UNITED STATES PATENT OFFICE 2,563,873

UNSATURATED POLYHYDRIC PHENOLIC ETHER-MODIFIED DRYING OILS AND PROCESS OF MAKING SAME

John B. Rust, East Hanover, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application November 12, 1947,
Serial No. 785,545

20 Claims. (Cl. 260—407)

The present invention relates to new modified drying oil products and to the process for the preparation of the same. More particularly, it relates to the reaction products of material containing drying oil acid radicals with unsaturated polymerizable polyhydric phenolic compounds having two or more beta-unsaturated aliphatic groups of from 3 to 4 carbon atoms. Such unsaturated polymerizable phenolic compounds are exemplified by polyvalent aromatic hydrocarbon allyl ethers and esters represented by the general formula:

where P is a polyvalent mononuclear or polynuclear aromatic hydrocarbon radical such as o-, m-, or p-phenylene, methylphenylene, dimethylphenylene, naphthylene, diphenylene, alkylene-bis-phenylene (e. g., methylene-bis-phenylene, isopropylidene-bis-phenylene, methylethylmethylene-bis-phenylene, cyclohexylidene-bis-phenylene, methyl-isobutylmethylene-bis-phenylene, etc.), or a trivalent benzene or naphthalene radical; R is a beta-unsaturated aliphatic radical having from 3 to 4 carbon atoms such as crotyl, butenyl, methallyl or allyl; $x$ is a number equal to 0 or 1, and $y$ is a number equal to 2 or 3, being equal to the valence of the aromatic hydrocarbon radical.

The unsaturated phenolic compounds used herein are high-boiling, pale-yellow liquids characterized by the common grouping of an oxygen atom attached to an aromatic ring and to a beta-unsaturated aliphatic group or to a beta-unsaturated monohydric alcohol ester of an aliphatic monocarboxylic acid such as acetic acid. They tend to set up to hard brittle resinous masses when heated at 150°–200° C. Such polymeric products may therefore be formed without the use of peroxides or other acidic catalysts. When thickened to a syrup and baked in the form of thin films, hard brittle masses are secured which are exceedingly alkali-resistant. When these unsaturated phenolic compounds are polymerized by themselves in the presence of heat, characteristic red to dark brown color-bodies are formed which give rise to the production of characteristically dark products. On the other hand, when they are combined with drying oil material such as drying oils, drying oil acids, or drying oil-containing alkyd resins, reaction is fairly rapid and they unexpectedly give light-colored, highly viscous, color-stable products which when saponified are completely soluble in water. When the aqueous solutions are acidified and the hydrolytic product washed and dried, the acids from these modified oils or oil-containing products show acid numbers of 100 to 160, depending upon the amount of unsaturated phenolic compounds employed.

These modified oils or oil-containing products may be converted by metallic driers, or a combination of metallic driers and heat to insoluble, infusible masses which possess surprisingly good resistance to the action of aqueous alkalies.

Thus, the following objects of the present invention are apparent:

(1) To provide a soluble modified drying oil composition of light color and low acid number which may be converted by metallic driers into hard, fast drying infusible masses which are substantially resistant to the action of aqueous alkali solutions.

(2) To provide a soluble modified drying oil ester or drying oil-containing alkyd resin of light color and low acid number which may be converted by metallic driers and heat into hard, non-yellowing, insoluble films which have high resistance to the action of aqueous alkali solutions.

(3) To provide a soluble modified drying oil which is fast bodying.

(4) To provide a soluble modified drying oil which may be heated with rosin esters, phenolic resins, alkyd resins, natural resins, and the like to give rapid drying coating compositions.

Other objects of the present invention will become apparent from the more detailed description set forth below.

These objects are attained by heating the unsaturated phenolic compound with drying oil material, the latter being 1. a drying oil (raw or bodied) or a polyhydric alcohol ester of drying oil acids other than the glycerol ester,
2. drying oil fatty acids,
3. a drying oil-modified alkyd resin,
4. a stoichiometrical mixture of drying oil acids and an esterifiable polyhydric alcohol (e. g., glycerol, pentaerythritol, etc.) to form an ester during the heating process, or
5. a stoichiometrical mixture of drying oil acids, an esterifiable polyhydric alcohol and a polycarboxylic acid (e. g., phthalic, succinic, adipic, sebacic, etc.) to form an alkyd resin during the heating process.

The drying oil material and the unsaturated phenolic compound are heated together in a suitable reactor at a temperature of 200° C. to 300° C., until the reaction is substantially complete as shown by no more refluxing of the unsaturated phenolic compound. Heating is then continued until the reaction mixture reaches the desired viscosity. In general, a temperature of 240°–260° C. for 2 to 6 hours is sufficient to complete the reaction. In practice, an inert atmosphere of carbon dioxide or nitrogen may be employed to prevent any oxidation of the oil product, although its use is not essential. Neither is it necessary to employ a catalyst in the reaction, since combination takes place in the presence of heat as already described. Except where drying oil acids alone are reacted with the phenolic compound, the resulting reaction products are clear and light-colored, and have a very low acid number. The reaction products from drying oil acids and the phenolic compounds are acids which may be esterified or converted into salts, e. g., soaps, metallic driers, etc.

The products of this invention range from viscous oils to hard, tough resinous masses depending upon the formulation, and the heat treatment of the product. They may be blended with cellulose esters such as nitrocellulose to give hard, tough, flexible air-drying coatings. They may also be used to modify rosin esters, phenolic resins, urea-formaldehyde resins, and the like. They may also be combined with styrene, acrylic acid esters, methacrylic acid esters, acrylonitrile, and the like to obtain products useful to those skilled in the art. Such a combination with styrene, acrylic acid esters, methacrylic acid esters and the like may be secured in the following ways:

(a) Reaction between the modified oil and the vinyl type compound, followed by polymerization, and (b) Reaction between the unsaturated phenolic compound and vinyl type compound followed by reaction with the drying oil material.

In practicing the process of the present invention, it is possible to employ as little as 1% or as much as 50% of unsaturated phenolic product (based on the drying oil material); however, proportions of 5% to 30% are to be preferred, since this range of unsaturated phenolic compound imparts the desired degree of modification to the drying oil material.

We do not wish to limit ourselves to any theoretical explanation of the reaction, although it is probable that the reaction involved is one of addition. It is presumably an addition of the allyl groups (or other unsaturated hydrocarbon), attached to the phenol by way of the oxygen linkage, to the unsaturated fatty acid radicals, since drying properties and alkali resistance as shown in the accompanying examples appear to be superior where proportions of about one fatty acid radical to one beta-unsaturated alkyl group are employed.

As noted above it is possible to employ drying oil-modified alkyd resins in place of drying oils, or to employ a mixture of drying oil fatty acids, polyhydric alcohol, polycarboxylic acid and unsaturated phenolic ether (e. g., a mixture of linseed oil acids, pentaerythritol, phthalic anhydride and the diallyl ether of diphenylolpropane, the object thereby being to provide modified drying oil products having superior drying qualities and superior resistance to alkali. Also, as noted above it is within the scope of the present invention to provide modified oil products wherein drying oil fatty acids, polyhydric alcohol, and unsaturated phenolic ether are reacted together simultaneously to provide an oil product having the properties heretofore disclosed.

There are, of course, numerous unsaturated phenolic compounds of the type employed in the practice of the present invention. For the purpose of illustration these include the beta-unsaturated alkyl (e. g., allyl) ethers of such polyhydric phenols as pyrocatechol, resorcinol, hydroquinone, orcinol, toluhydroquinone, dihydroxyxylenes, pyrogallol, phloroglucinol, hydroxyhydroquinone, di- and trihydroxynaphthalenes, diphenylol, diphenylolmethane and the reaction products of 2 moles of a monohydric phenol with 1 mole of a ketone (e. g., acetone, methyl ethyl ketone, methyl isobutyl ketone, cyclohexanone, etc.) such as diphenylolpropane, diphenylolbutane, diphenylolhexane, diphenylolcyclohexane and the like.

The ethers are made in known manner by reacting the above polyhydric phenols with an unsaturated halide such as allyl chloride or bromide, methallyl chloride, 3-chloro-1-butene or crotyl chloride, and the ether-esters are advantageously made by reacting the polyhydric phenol with a monohalogenated monocarboxylic acid (preferably chloroacetic acid on account of its ease of reaction and availability) and then esterifying the aryloxy-substituted acid with an unsaturated alcohol such as allyl, methallyl, butenyl or crotyl.

While most of the examples herein teach the use of linseed oil, other drying oils (and drying oil acids therefrom) such as China-wood oil, oiticica oil, soya bean oil, cottonseed oil, perilla oil, corn oil, sunflower seed oil, and the like may be employed and are to be considered within the scope of the invention.

The following examples are given by way of illustration only and should not be considered as limiting. All proportions are in parts by weight.

*Example 1*

150 parts of raw linseed oil and 25 parts of the diallyl ether of diphenylolpropane are heated together in a one-liter, 3-neck flask equipped with a thermometer, stirrer and water-cooled condenser to 250° C. Heating is thereafter continued at 260°–280° C. for 4½ hours. A light-colored, clear oil is secured which possesses a Gardner viscosity of E and an acid number of 7.

A film of the oil containing 0.6% lead and 0.06% cobalt as naphthenates air-dries to a hard, non-tacky film in 24 hours.

50 parts of ester gum and 80 parts of the above oil are heated together to 280° C. in ½ hour. Heating is thereafter continued at 280°–290° C. for 70 minutes. The resulting light-colored varnish base may be drawn into a string 24 inches in length. It is thinned with V. M. and P. naphtha to 50% solids. The varnish has a Gardner viscosity of D to E.

To 50 parts of the above varnish is added 0.015% cobalt as cobalt naphthenate based upon the oil content of the varnish. A film of the varnish is baked for 1 hour at 120° C. The baked film is non-yellowing and possesses a Sward Rocker hardness of 39. The baked film of the varnish turns cloudy in 1% aqueous alkali after being immersed for 45 minutes.

To 50 parts of the above varnish is added 0.6% lead and 0.06% cobalt as naphthenates based upon the oil content of the varnish. The varnish air-dries to a tack-free film in 3½ hours. The dried film possesses a Sward Rocker hardness of 45 after 24 hours and 59 after 96 hours.

Example 2

150 parts of raw linseed oil and 42.5 parts of the diallyl ether of diphenylolpropane are heated together to 250° C. in a one-liter, 3-neck flask equipped with a thermometer, stirrer and water-cooled condenser. The resulting clear reaction mixture is finally heated at 260°–270° C. for 4¼ hours. A light-colored clear oil is secured having a Gardner viscosity of G and an acid number of 9.0.

A film of oil containing 0.6% lead and 0.06% cobalt as naphthenates air-dries to a hard, non-tacky film in 24 hours.

50 parts of ester gum and 80 parts of the above oil are heated together to 280° C. in ½ hour. Heating is thereafter continued at 280°–290° C. for 40 minutes. The resulting light-colored varnish base may be drawn into a string 24 inches in length. It is thinned with V. M. and P. naphtha to 50% solids. The varnish possesses a Gardner viscosity of F.

To 50 parts of the above varnish is added 0.015% cobalt as cobalt naphthenate based upon the oil content of the varnish. A film of the varnish is baked for 1 hour at 120° C. The baked film is non-yellowing and possesses a Sward Rocker hardness of 49. The baked film of the varnish turns cloudy in 1% aqueous alkali after being immersed for 120 minutes.

To 50 parts of the above varnish is added 0.6% lead and 0.06% cobalt as naphthenates based upon the oil content of the varnish. The varnish air-dries to a tack-free film in 3 hours. The dried film possesses a Sward Rocker hardness of 47 after 24 hours and 55 after 96 hours.

Example 3

150 parts of raw linseed oil and 80 parts of the diallyl ether of diphenylolpropane are heated together to 250° C. in a one-liter, 3-neck flask equipped with a thermometer, stirrer and water-cooled condenser. The resulting clear reaction mixture is finally heated at 250°–260° C. for 4 hours to give a light-colored clear oil having a Gardner viscosity of H and an acid number of 10.4.

A film of the oil containing 0.6% lead and 0.06% cobalt as naphthenates air-dries to a hard non-tacky film in 24 hours.

50 parts of ester gum and 80 parts of the above oil are heated together to 280° C. in ½ hour. Heating is continued at 280°–290° C. for 30 minutes. The resulting light-colored varnish base may be drawn into a string 24 inches in length. It is thinned with V. M. and P. naphtha to 50% solids to give a varnish of Gardner viscosity G.

To 50 parts of the above varnish is added 0.015% cobalt as cobalt naphthenate based upon the oil content of the varnish. A film of the varnish, baked for 1 hour at 120° C. is non-yellowing and of Sward Rocker hardness 55. The baked film of the varnish turns cloudy in 1% aqueous alkali after being immersed for 180 minutes.

To 50 parts of the above varnish is added 0.6% lead and 0.06% cobalt based upon the oil content of the varnish. The varnish air-dries to a tack-free film in 3 hours. The dried film possesses a Sward Rocker hardness of 49 after 24 hours and 59 after 96 hours.

Example 4

100 parts of oiticica oil and 5 parts of the dimethallyl ether of resorcinol are heated together in a 500 ml., 3-neck flask equipped with a thermometer, stirrer, and water-cooled condenser to 200° C. Heating is thereafter continued at 200°–210° C. for 3¾ hours. A light-colored, extremely viscous oil is secured with an acid number of 4.

A film of the oil containing 0.6% lead and 0.06% cobalt as naphthenates air-dries to a tack-free film in 24 hours.

Example 5

150 parts of raw soya bean oil and 55 parts of the dimethallyl ether of resorcinol are heated together in a one-liter, 3-neck flask equipped with a thermometer, stirrer and water-cooled condenser to 250° C. Heating is thereafter continued at 250°–260° C. for 4¼ hours. A light-colored viscous oil of acid number 3 and Gardner viscosity H results.

A film of the oil containing 0.6% lead and 0.06% cobalt as naphthenates air-dries to a tack-free film in 24 hours.

A film of the oil containing 0.015% cobalt as cobalt naphthenate, after baking for ½ hour at 160° C. is hard and non-yellowing. It is unaffected by 1% alkali solution after immersion for 1 hour.

50 parts of the oil of Example 5, and 50 parts of 20% aqueous caustic soda are refluxed at boiling in admixture with 50 parts of isopropanol for ½ hour. A clear solution forms. After acidification, washing and drying, a clear, light-colored oil is secured having an acid number of 103.

Example 6

100 parts of linseed oil and 20 parts of the diallyl ether of resorcinol are heated together in a 500 ml. 3-neck flask equipped with a thermometer, stirrer and water-cooled condenser to 240° C. Heating is thereafter continued at 240° C.–250° C. for 6 hours. A light-colored, extremely viscous oil is secured which possesses an acid number of 7.

A film of the oil containing 0.6% lead and 0.06% cobalt as naphthenates air-dries to a tack-free film in 24 hours.

Example 7

100 parts of soya bean oil and 20 parts of the triallyl ether of pyrogallol are heated together in a 500 ml., 3-neck flask equipped with a thermometer, stirrer and water-cooled condenser to 240° C. Heating is thereafter continued at 240° C.–250° C. for 5 hours. A light-colored, extremely viscous oil is secured which possesses an acid number of 9.

A film of the oil containing 0.6% lead and 0.06% cobalt as naphthenates air-dries to a tack-free film in 24 hours.

Example 8

150 parts of raw linseed oil and 22.5 parts of the diallyl ester of resorcinol diacetic acid (diallyl m-phenyleneoxyacetate) are heated together in a one-liter, 3-neck flask equipped with a thermometer, stirrer and water-cooled condenser to 250° C. Heating is thereafter continued at 250°–260° C. for 6 hours. A light-colored, extremely viscous oil results. Acid number 8.6.

A film of the oil containing 0.6% lead and 0.06% cobalt as naphthenates air-dries to a tack-free hard coating in 24 hours.

50 parts of ester gum and 80 parts of the above oil are heated together to 280° C. in ½ hour. Heating is thereafter continued at 280° C.–290° C. for 57 minutes. The resulting varnish base may be drawn into a string 24 inches in length. The light-colored varnish base is thinned to 50% solids with V. M. and P. naphtha giving a varnish of Gardner viscosity F.

To 50 parts of the above varnish is added 0.015% cobalt as cobalt naphthenate based upon the oil content of the varnish. A film of the varnish baked for one hour at 120° C. is non-yellowing. It has a Sward Rocker hardness of 57 and turns white in 1% aqueous alkali after 1½ hours of immersion.

To 50 parts of the above varnish is added 0.6% lead and 0.06% cobalt as naphthenates based upon the oil content of the varnish. The varnish air-dries to a tack-free film in 4 hours. The dried film possesses a Sward hardness of 55 after 24 hours and 59 after 96 hours.

Example 9

150 parts of raw linseed oil and 22.5 parts of the diallyl ester of the diacetic acid derivative of diphenylolpropane (diallyl isopropylidene-bis (phenoxyacetate) are heated together in a one-liter, 3-neck flask equipped with a thermometer, stirrer and water-cooled condenser to 250° C. Heating is thereafter continued at 250°–260° C. for 5 hours. A light-colored, extremely viscous oil is secured. Acid number 7.9.

A film of the oil containing 0.6% lead and 0.06% cobalt as naphthenates air-dries to a hard tack-free film coating in 24 hours.

50 parts of ester gum and 80 parts of the oil of Example 9 are heated together to 280° C. in ½ hour. Heating is thereafter continued at 280° C.–290° C. for 38 minutes. The resulting varnish base can be drawn into a string 24 inches in length. The light-colored varnish base when thinned to 50% solids with V. M. and P. naphtha has a Gardner viscosity of F.

To 50 parts of the above varnish is added 0.015% cobalt as cobalt naphthenate based upon the oil content of the varnish. A film of the varnish baked for one hour at 120° C. is non-yellowing. It possesses a Sward Rocker hardness of 61 and turns cloudy in 1% aqueous alkali after 1¼ hours of immersion.

To 50 parts of the above varnish is added 0.6% lead and 0.06% cobalt as naphthenates based upon the oil content of the varnish. The varnish air-dries to a tack-free film in 3½ hours. The dried film shows a Sward hardness of 57 after 24 hours and 59 after 96 hours.

The ester gum varnishes from the oil examples were carefully compared with a like varnish from ester gum and bodied linseed oil ("Alinco" Z–2).

50 parts of ester gum and 80 parts of bodied linseed oil are heated together to 280° C. in ½ hour. The resulting varnish base is then heated further at 280°–290° C. for 110 minutes and may be drawn into a string 24 inches in length. The varnish base, thinned to 50% solids with V. M. and P. naphtha, possesses a Gardner viscosity of D. To 50 parts of the above varnish is added 0.015% cobalt as cobalt naphthenate based upon the oil content of the varnish. A film of the varnish when baked for one hour at 120° C. is decidedly darkened. It possesses a Sward Rocker hardness of 24 and turns white in 1% aqueous alkali after 15 minutes of immersion. To 50 parts of the above varnish is added 0.6% lead and 0.06% cobalt as naphthenates which air-dries to a tack-free film in 7½ hours. The dried film shows a Sward hardness of 27 after 24 hours and 47 after 96 hours.

The following table is presented to show differences between varnishes prepared from bodied linseed oil and the varnishes prepared from the oils disclosed in certain of the above examples.

| | "Alinco" Z–2 | Example Numbers | | | | |
|---|---|---|---|---|---|---|
| | | 1 | 2 | 3 | 8 | 9 |
| VARNISHES | | | | | | |
| Cooking time at 280°–290° C. (min.) | 110 | 70 | 40 | 30 | 57 | 38. |
| Gardner viscosity (50% Solids) | D | D–E | F | G | F | F. |
| Drying time (Tack-free) | 7½ hrs | 3½ hrs | 3 hrs | 3 hrs | 4 hrs | 3½ hrs. |
| Sward hardness (24 hours) | 27 | 45 | 47 | 49 | 55 | 57. |
| Sward hardness (96 hours) | 47 | 59 | 55 | 59 | 59 | 59. |
| BAKED VARNISHES | | | | | | |
| Color of baked film | yellowed | non-yellowing. | non-yellowing. | non-yellowing. | non-yellowing. | non-yellowing. |
| Sward Hardness | 24 | 39 | 49 | 55 | 57 | 61. |
| Resistance to 1% aqueous alkali | white in 15 min. | white in 45 min. | white in 120 min. | white in 180 min. | white in 90 min. | white in 75 min. |

Example 10

21 parts of phthalic anhydride, 29 parts of glycerol, 125.1 parts of soya bean oil acids, and 30 parts of the diallyl ether of diphenylolpropane are placed in a 500-ml., 3-neck flask equipped with a thermometer, stirrer and a water-trap attached directly to a water-cooled condenser. Heating is carried out at 200°–210° C. for 6 hours.

16.2 parts of distillate are collected in the water-trap. A light-colored, hard product having an acid number of 12.2 is obtained. The modified alkyd resin is dissolved in xylol to form a clear solution of 50% solids. 0.6% lead and 0.06% cobalt as naphthenates based upon the soya bean oil acids content of the resin are added. The resin solution air-dries to a non-tacky film in 5¼ hours.

Example 11

One hundred parts of a drying oil alkyd resin of acid number 30 (formed by heating a mixture of 148 parts phthalic anhydride, 80 parts of glycerol, 140 parts of linseed oil acids and 150 parts of linseed oil) and 20 parts of the diallyl ester of diphenylolpropane diacetic acid are heated together in a 500 ml., 3-neck flask equipped with a thermometer, stirrer, and water-cooled condenser to 200° C. in one hour. Heating is thereafter continued at 210° C.–220° C. for 5¼ hours. An exceedingly viscous resinous product is formed.

25 parts of this resin and 25 parts of xylol are warmed together to form a clear solution. A film of the xylol solution baked at 120° C. for one hour is hard and tough. The baked film spotted in 1% aqueous alkali after immersion for 2¼ hours.

It will be understood that it is intended to cover all changes and modifications of the examples of the invention herein chosen for the purpose of illustration which do not constitute departures from the spirit and scope of the invention.

We claim:

1. A composition comprising the reaction product at between 200°–300° C. of (a) drying oil fatty acids material with (b) a polyhydric phenolic unsaturated ether having the formula $$P(-OCH_2COOR)_y$$

wherein P is an aromatic hydrocarbon polyvalent radical selected from the group consisting of phenylene and an alkylene bis phenylene in which the alkylene group has from one to six carbon atoms, R is a beta-unsaturated aliphatic hydrocarbon radical containing 3 to 4 carbon atoms, and y is the valence of the radical P and is a number selected from 2 and 3.

2. The composition of claim 1 wherein the polyhydric phenolic unsaturated ether is diallyl isopropylidene-bis-phenylene-oxyacetate.

3. The composition of claim 1 wherein the polyhydric phenolic unsaturated ether is the diallyl ester of resorcinol diacetic acid.

4. A composition comprising the reaction product at between 200° and 300° C. of a drying oil with a polyhydric phenolic unsaturated ether having the formula $P(-OCH_2COOR)_y$, wherein P is an aromatic hydrocarbon polyvalent radical selected from the group consisting of phenylene and an alkylene bis phenylene in which the alkylene group has from one to six carbon atoms, R is a beta-unsaturated aliphatic hydrocarbon radical containing 3 to 4 carbon atoms, and y is the valence of the radical P and is a number selected from 2 and 3.

5. A composition comprising the reaction product at between 200° and 300° C. of linseed oil with from 1% to 50% (based on the linseed oil) of the diallyl ester of resorcinol diacetic acid.

6. A composition comprising the reaction product at between 200° and 300° C. of linseed oil with from 1% to 50% (based on the linseed oil) of the diallyl ester of isopropylidene-bis-phenoxyacetic acid.

7. A composition comprising the reaction product at between 200° C. and 300° C. of linseed oil with from 1% to 50% of a polyhydric phenolic unsaturated ether having the formula $$P(-OCH_2COOR)_y$$

wherein P is an aromatic hydrocarbon polyvalent radical selected from the group consisting of phenylene and an alkylene bis phenylene in which the alkylene group has from one to six carbon atoms, R is a beta-unsaturated aliphatic hydrocarbon radical containing 3 to 4 carbon atoms, and y is the valence of the radical P and is a number selected from 2 and 3.

8. A composition comprising the reaction product at between 200° and 300° C. of soya bean oil with from 1% to 50% of a polyhydric phenolic unsaturated ether having the formula $$P(-OCH_2COOR)_y$$

wherein P is an aromatic hydrocarbon polyvalent radical selected from the group consisting of phenylene and an alkylene bis phenylene in which the alkylene group has from one to six carbon atoms, R is a beta-unsaturated aliphatic hydrocarbon radical containing 3 to 4 carbon atoms, and y is the valence of the radical P and is a number selected from 2 and 3.

9. A solution of the product of claim 1 in a volatile hydrocarbon solvent therefor.

10. The process of making a drying oil composition adapted for coating compositions, which comprises heating at between 200° and 300° C. (a) drying oil fatty acids material with (b) a polyhydric phenolic unsaturated ether having the formula $P(-OCH_2COOR)_y$, wherein P is an aromatic hydrocarbon polyvalent radical selected from the group consisting of phenylene and an alkylene bis phenylene in which the alkylene group has from one to six carbon atoms, R is a beta-unsaturated aliphatic hydrocarbon radical containing 3 to 4 carbon atoms, and y is the valence of the radical P and is a number selected from 2 and 3.

11. The process of claim 10 in which the fatty acids material is linseed oil.

12. The process of claim 10 in which the fatty acids material is soya bean oil.

13. The process of claim 10 in which the fatty acids material is an alkyd resin.

14. The process of claim 10 in which the phenolic derivative is diallyl isopropylidene-bis-phenylene-oxyacetate.

15. The process of claim 10 in which the phenolic derivative is the diallyl ester of resorcinol diacetic acid.

16. The process of claim 10 in which the phenolic derivative is diallyl isopropylidene-bis-phenylene-oxyacetate, and the fatty acids material is linseed oil.

17. The process of claim 10 in which the phenolic derivative is the diallyl ester of resorcinol diacetic acid, and the fatty acids material is linseed oil.

18. The process of claim 10 in which the phenolic derivative is diallyl isopropylidene-bis-phenylene-oxyacetate, and the fatty acids material is an alkyd resin.

19. The composition of claim 1 in which the fatty acids material is an alkyd resin.

20. The composition of claim 1 in which the fatty acids materials is an alkyd resin and the phenolic derivative is diallyl isopropylidene-bis-phenylene-oxyacetate.

JOHN B. RUST.
WILLIAM B. CANFIELD.

REFERENCES CITED

The following references are of record in the file of this patent:

UNITED STATES PATENTS

| Number | Name | Date |
|---|---|---|
| 2,285,797 | Bellefontaine | June 9, 1942 |